United States Patent
Serrano Aviles et al.

(10) Patent No.: US 10,450,420 B2
(45) Date of Patent: Oct. 22, 2019

(54) SEGMENTED COPOLYMER COMPOSITION WITH IMPROVED PROPERTIES

(71) Applicant: DYNASOL ELASTÓMEROS, S. A., Madrid (ES)

(72) Inventors: Luis Serrano Aviles, Madrid (ES); Diana Martinez Wichtel, Madrid (ES); Luisa María Fraga Trillo, Madrid (ES)

(73) Assignee: DYNASOL ELASTÓMEROS, S.A., Madrid (ES)

( * ) Notice: Subject to any disclaimer, the term of this patent is extended or adjusted under 35 U.S.C. 154(b) by 88 days.

(21) Appl. No.: 15/537,558

(22) PCT Filed: Feb. 12, 2016

(86) PCT No.: PCT/EP2016/052978
§ 371 (c)(1),
(2) Date: Jun. 19, 2017

(87) PCT Pub. No.: WO2016/128535
PCT Pub. Date: Aug. 18, 2016

(65) Prior Publication Data
US 2018/0265643 A1    Sep. 20, 2018

(30) Foreign Application Priority Data

Feb. 12, 2015  (EP) ..................................... 15382058

(51) Int. Cl.
| | | |
|---|---|---|
| C08G 81/02 | (2006.01) | |
| C08G 18/62 | (2006.01) | |
| C08G 18/65 | (2006.01) | |
| C08G 18/66 | (2006.01) | |
| C08G 18/76 | (2006.01) | |
| C08F 297/04 | (2006.01) | |
| C08G 18/08 | (2006.01) | |
| C08G 18/42 | (2006.01) | |
| C08G 18/48 | (2006.01) | |
| B32B 9/04 | (2006.01) | |
| B32B 15/08 | (2006.01) | |
| B32B 27/08 | (2006.01) | |
| B32B 27/28 | (2006.01) | |
| B32B 27/30 | (2006.01) | |
| B32B 27/34 | (2006.01) | |
| B32B 27/36 | (2006.01) | |
| B32B 27/40 | (2006.01) | |
| B32B 27/06 | (2006.01) | |
| C08L 75/06 | (2006.01) | |
| C08G 101/00 | (2006.01) | |
| C08L 91/00 | (2006.01) | |

(52) U.S. Cl.
CPC ............ C08G 81/024 (2013.01); B32B 9/045 (2013.01); B32B 15/08 (2013.01); B32B 27/06 (2013.01); B32B 27/08 (2013.01); B32B 27/285 (2013.01); B32B 27/302 (2013.01); B32B 27/308 (2013.01); B32B 27/34 (2013.01); B32B 27/36 (2013.01); B32B 27/365 (2013.01); B32B 27/40 (2013.01); C08F 297/04 (2013.01); C08G 18/0895 (2013.01); C08G 18/4238 (2013.01); C08G 18/4804 (2013.01); C08G 18/6208 (2013.01); C08G 18/6588 (2013.01); C08G 18/664 (2013.01); C08G 18/7621 (2013.01); C08G 18/7671 (2013.01); C08L 75/06 (2013.01); B32B 2270/00 (2013.01); B32B 2274/00 (2013.01); B32B 2307/536 (2013.01); B32B 2307/54 (2013.01); B32B 2307/554 (2013.01); B32B 2307/5825 (2013.01); C08G 2101/0008 (2013.01); C08G 2101/0058 (2013.01); C08G 2101/0083 (2013.01); C08L 91/00 (2013.01)

(58) Field of Classification Search
USPC ......................................................... 525/165
See application file for complete search history.

(56) References Cited

U.S. PATENT DOCUMENTS

| | | |
|---|---|---|
| 5,925,724 A | 7/1999 | Cenens et al. |
| 7,138,175 B2 | 11/2006 | Saito |
| 2013/0316164 A1 | 11/2013 | Peterson et al. |

FOREIGN PATENT DOCUMENTS

| | | |
|---|---|---|
| EP | 0522658 A1 | 1/1993 |
| EP | 0611806 B1 | 8/1994 |
| EP | 0796899 A1 | 9/1997 |
| EP | 0994919 B1 | 4/2000 |
| EP | 1411083 A1 | 4/2004 |

(Continued)

OTHER PUBLICATIONS

Lu et al., *Reactivity of Common Functional Groups with Urethanes: Models for Reactive Compatibilization of Thermoplastic Polyurethane Blends*, 40 Journal of Polymer Science 2310-2328 (Apr. 5, 2002).

(Continued)

*Primary Examiner* — Terressa Boykin
(74) *Attorney, Agent, or Firm* — Buchanan Ingersoll & Rooney PC

(57) ABSTRACT

The present invention relates to a segmented block copolymer composition based on diblock and/or triblock copolymers of vinyl aromatic monomer and hydrogenated butadiene blocks and thermoplastic polyurethane blocks which are linearly bonded by N or O atoms, and its procedure of obtainment based on reactive extrusion. Furthermore, the present invention relates to a thermoplastic composition, a laminate structure and a polyurethane foam, with improved properties, comprising the segmented block copolymer composition.

16 Claims, 5 Drawing Sheets

(56) References Cited

FOREIGN PATENT DOCUMENTS

| JP | 2004059636 A | 2/2004 |
|---|---|---|
| WO | WO 1999029777 A1 | 6/1999 |
| WO | WO 2011077234 A2 | 6/2011 |

OTHER PUBLICATIONS

European Search Report issued in corresponding European Patent Application No. 15382058.4 (dated Aug. 6, 2015).

SEGMENTED COPOLYMER COMPOSITION WITH IMPROVED PROPERTIES

CROSS-REFERENCE TO RELATED APPLICATIONS

This application is a U.S. National Stage Application pursuant to 35 U.S.C. § 371 of International Patent Application PCT/EP2016/052978, filed on Feb. 12, 2016, and published as WO 2016/128535 on Aug. 18, 2016, which claims priority to European Patent Application 15382058.4, filed on Feb. 12, 2015, all of which are incorporated herein by reference in their entireties for all purposes.

The present invention relates to a segmented block copolymer composition based on diblock and triblock copolymers of vinyl aromatic monomer and hydrogenated butadiene blocks and thermoplastic polyurethane blocks which are linearly bonded by N or O atoms, and its procedure of obtainment based on reactive extrusion. Furthermore, the present invention relates to a thermoplastic composition, a laminate structure and a polyurethane foam, with improved properties, comprising the segmented block copolymer composition.

BACKGROUND ART

Thermoplastic polyurethane (TPU) is a versatile elastomer that shows a good performance regarding resistance to oils and grease, tear and abrasion resistance, low temperature flexibility, resilience and tensile strength, but this material is also noted for having "poor to fair" hydrolysis resistance and a relatively high cost. TPU is a block copolymer that owes its elastic properties to the phase separation of so-called "hard blocks" and "soft blocks". Hard blocks are rigid structures physically cross-linked that give the polymer its firmness; soft blocks are stretchable chains that give the polymer its elasticity. It is worth noting that the presence of polar and non-polar counterbalanced microdomains in the TPU structure is the cause of its good chemical resistance, particularly oil and grease resistance.

TPU is commonly used in footwear, automotive and electronics products. Furthermore, TPU is a component of hoses, belts, tubes, products of the industrial machinery and the like, but it has the drawbacks of poor hydrolytic and weather resistance, and hence its uses are limited.

TPU is the reaction product of a diisocyanate, a chain extender (a short chain diol) and a polyol, wherein urethane groups are formed along the polymer chain. TPU can be produced in several ways, but the most common process is a reactive extrusion, wherein a polyol containing polyhydroxyl compounds, chain extenders, additives, and isocyanate compounds are fed into an extruder in a precise ratio aiming to achieve the properties needed for the final application. However, reactive extrusion method is not flexible enough to obtain all the desirable properties.

On the other hand, styrene block copolymers (SBCs) are widely used as elastomers in industry due to their excellent mechanical properties, elasticity and hydrolytic resistance. Furthermore, SBCs exhibit excellent weather resistance when hydrogenated. SBCs are also block copolymers that owe their elastic properties to the phase separation of "hard blocks" and "soft blocks", which gives the polymer its firmness and its elasticity respectively. Nevertheless, SBC uses are limited due to their poor resistance to oil and abrasion, among other drawbacks.

Polar resins like polyurethanes are incompatible, and hence hardly blended or mixed with polyolefins such as polyethylene, polypropylene, or with diene-based elastomers such as SBCs ("Polymer Blends" by D. R. Paul and S. Newman, Volume 1, 2, Academic Press, Inc., 1978//Thermoplastic Elastomers. RP Quirk). Despite of this, the co-processing of TPUs and SBCs has been attempted by means of mechanical blending or by compounding with an extruder (co-extrusion) in order to achieve a more intimate mixing.

The incompatibility of both polymers results in non-homogeneous blends which tend to delaminate, and often feature poor mechanical properties. Another disadvantage is that the compounding process, since it is done at relatively high temperatures, has a detrimental effect on the physical properties of the modified TPU produced that way, since the polymers will undergo a thermal degradation during processing. A further disadvantage is that the production is long and costly.

Aiming to prevent separation of the SBC from the TPU and obtaining an homogeneous mixture with properties that combine the ones of SBC and the ones of TPU, compatibilizing agents have been used.

For instance, WO99/29777 describes the use of a copolymer obtained as the reaction product of a maleic anhydride grafted polypropylene and a polyamide. This compatibilizing agent is used in blends of non-polar EPDM and thermoplastic polyurethane or polyvinylidene fluoride. In WO 2011/077234, styrene and ethylene/butylenes grafted with maleic anhydride onto the rubber mid-block are used to improve compatibility of these polymers with TPU. In both cases, the presence of maleic groups along the polymer chain leads to crosslinking reactions that are difficult to control, yielding polymer mixtures with high viscosity and low processability.

U.S. Pat. No. 5,925,724 and EP0994919B1 teach the use of optionally hydrogenated polybutadiene diols that are added to a TPU formulation, thus reacting with isocyanate groups and forming a TPU/polybutadiene hybrid polymer. In U.S. Pat. No. 5,925,724, the TPU composition is prepared by a prepolymer method. In EP0994919B1, the resulting polymer has improved compatibility with polyolefin compounds. In order to ensure a good mixture with the polyurethane components, short chain polybutadiene diols are required. This feature decreases mechanical properties, and leads to a poor phase separation of the final product and hence, limited compatibilization properties.

Some other products include styrene based block copolymers. For example, EP0611806 and U.S. Pat. No. 7,138,175 use SBCs functionalized with OH groups and reacted with TPU. In the first document, SBCs containing isoprene and OH groups are blended together with TPU at 200° C. In order to control the reaction rate, a catalyst deactivator like distearyl phosphate is required. This substance is used as antifoaming or to prevent the extensive occurrence of ester interchange during blending. The resulting process is costly and it does not solve the problems of polymer degradation during blending. In U.S. Pat. No. 7,138,175, SBCs containing OH groups are reacted with the polyol and the isocyanate compounds in the feed zone of an extruder, and a functionalized styrene copolymer is added in the compression zone of the said extruder. According to this document, hydroxyl functional groups on the SBC are required in order to react with the polyurethane product and improve compatibilization of the TPU and block copolymers. The main disadvantage of these methods is the limited reactivity of hydroxyl functional groups with isocianate groups as mentioned in Journal of Polymer Science: Part A: Polymer Chemistry, Vol. 40, 2310-2328 (2002)), which leads to low reaction efficiency. Another disadvantage is that the compounding process, since it is done at relatively high temperatures, has a detrimental effect on the physical properties of the styrene-based block copolymers, since the polymers will undergo a thermal degradation. A further disadvantage is that removing undesirable reaction products is long and costly.

For the several drawbacks existing in the processes described above, there is the need of developing compatibilizers of TPU and SBC elastomers, aiming to achieve improved properties in the final product blend.

Other kind of products that can be improved with the compatibilization between thermoplastic polyurethanes and styrene block copolymers are polyurethane (PU) foams. These materials are widely used in upholstery, bedding, cushioning, insulation panels, footwear and many other applications. The basic chemistry of polyurethane foams and thermoplastic polyurethanes is alike, consisting in the formation of urethane linkages from the reaction of polyols and isocyanates. It is provided that the introduction of SBCs to the PU foam structure will confer better properties, especially mechanical, to the resulting material.

In this sense, US2013/0316164 describes a PU foam prepared by introducing a plasticiced triblock copolymer gel into a mixture of polyurethane foam forming components including a polyol and an isocyanate. The plasticized triblock copolymer gel is previously prepared mixing a styrene ethylene/butylene styrene triblock copolymer (SEBS) with oil. The PU foam obtained has improved thermal conductivity, improved heat capacity, and higher support factors. Nevertheless, the synthesis of the foam does not occur due to the poor compatibility between the elastomer and the polyurethane foam forming components; thus, collapsing of the foam or non-homogeneous blends with non-homogenous properties are often observed.

Consequently, the addition of a suitable compatibilizer between SBCs and polyurethanes to the PU foam is desirable to obtain high performance materials.

SUMMARY OF THE INVENTION

The present invention relates to a segmented block copolymer composition based on diblock and/or triblock copolymers of vinyl aromatic monomer and hydrogenated butadiene blocks and TPU blocks which are linearly bonded by N or O atoms. This segmented block copolymer composition is obtained via modification of TPU synthesis by reactive extrusion, and in absence of further purification.

Furthermore, the present invention relates to a thermoplastic composition comprising the segmented block copolymer composition. The thermoplastic composition has excellent mechanical properties due to the better compatibility acquired thanks to the presence of the segmented block copolymer composition. Indeed, the thermoplastic polymer composition exhibits better tensile strength; better tear resistance and better abrasion resistance. Moreover, the thermoplastic polymer composition of the present invention exhibits enhanced adhesion properties and non-tackiness.

The present invention further relates to a laminate structure comprising the thermoplastic polymer composition described above. The thermoplastic polymer composition presents enhanced adhesion properties to polar substrates, which leads to better mechanical and adhesive properties. Thus, a laminate structure of a polar substrate and the thermoplastic polymer composition can be prepared, avoiding the use of an additional adhesive layer.

A polyurethane foam (PU) comprising particles of the segmented block copolymer composition of the invention. The PU foam presents improved mechanical properties due to the presence of the SBC copolymer segments of the segmented block copolymer composition, which impart better tensile properties. The segmented block copolymer composition can be incorporated in the PU foam without collapse of the same. This is attributed to the high dispersion level of the segmented block copolymer composition in the polyol components of the polyurethane foam formulation, thus allowing the incorporation of the block copolymers in the polyurethane foam structure.

Thus, a first aspect of the present invention relates to a segmented block copolymer composition (herein "composition of the invention") which comprises:
a diblock copolymer comprising a block copolymer of vinyl aromatic monomer and hydrogenated butadiene and a block of thermoplastic polyurethane
and/or a triblock copolymer comprising terminal blocks of vinyl aromatic monomer and hydrogenated butadiene and a mid-block of thermoplastic polyurethane,
wherein
the blocks of copolymer of vinyl aromatic monomer and hydrogenated butadiene and the blocks of thermoplastic polyurethane are linearly bonded by O or N atoms, preferably the diblock copolymer is in a weight percent between 10% and 50% based on the total weight of the segmented block copolymer composition, more preferably between 20% and 40%; and/or the triblock copolymer is in a weight percent between 10% and 50% based on the total weight of the segmented block copolymer composition, more preferably between 10% and 40%.

In a preferred embodiment, the composition of the invention comprises:
a diblock copolymer comprising a block copolymer of vinyl aromatic monomer and hydrogenated butadiene and a block of thermoplastic polyurethane
and a triblock copolymer comprising terminal blocks of vinyl aromatic monomer and hydrogenated butadiene and a mid-block of thermoplastic polyurethane,
wherein the blocks of copolymer of vinyl aromatic monomer and hydrogenated butadiene and the blocks of thermoplastic polyurethane are linearly bonded by O or N atoms.

In a preferred embodiment of the composition of the invention the weight ratio between the diblock and the triblock copolymers ranges from 3:1 to 1:1; more preferably, from 2:1 to 1:1; more preferably, from 1.5:1 to 1:1.

In a preferred embodiment of the composition of the invention, the molecular weight of the peak $M_p$ measured by gel permeation chromatography (GPC) of the diblock copolymers is in the range between 60.000 gmol$^{-1}$ and 125.000 gmol$^{-1}$; preferably between 70.000 gmol$^{-1}$ and 110.000 gmol$^{-1}$; and more preferably between 80.000 gmol$^{-1}$ and 105.000 gmol$^{-1}$ and the molecular weight of the peak $M_p$ measured by GPC of the triblock copolymers is in the range between 110.000 gmol$^{-1}$ and 320.000 gmol$^{-1}$; preferably between 120.000 gmol$^{-1}$ and 300.000 gmol$^{-1}$; and more preferably between 130.000 gmol$^{-1}$ and 285.000 gmol$^{-1}$.

In the present invention the "molecular weight of the peak $M_p$" is obtained by gel permeation chromatography (GPC) using the standard polystyrene calibration curve with the Mark-Houwink constants k=0.0003253 and alpha=0.693, and refers to the value of the molar mass measured at the maximum of the peak of the chromatogram.

A preferred embodiment of the invention refers to the composition which further comprises block copolymer of vinyl aromatic monomer and hydrogenated butadiene and/or functionalized block copolymer of vinyl aromatic monomer and hydrogenated butadiene and/or thermoplastic polyurethane.

This embodiment refers to unreacted functionalized or non-functionalized block copolymers of vinyl aromatic monomer and hydrogenated butadiene which may be part of the composition of the invention.

The term "functionalized block copolymer of vinyl aromatic monomer and hydrogenated butadiene" refers to a block copolymer of vinyl aromatic monomer and hydrogenated butadiene described in the present invention which comprises a terminal functional group selected from an hydroxyl group, a primary amino group or a secondary amino group.

Preferably, the weight percent of the block copolymer of vinyl aromatic monomer and hydrogenated butadiene and functionalized block copolymer of vinyl aromatic monomer and hydrogenated butadiene ranges from 0.1 to 40% based on the total weight of the segmented block copolymer composition; preferably from 10 to 35%.

The composition of the invention which further comprises thermoplastic polyurethane relates to unreacted thermoplastic polyurethane which may be part of the composition of the invention. Preferably, the weight percent of the thermoplastic polyurethane ranges from 0.1 to 40%, based on the total weight of the segmented block copolymer composition; preferably from 10 to 35%.

In a preferred embodiment of the invention, the molecular weight of the peak $M_p$ of the block copolymer of vinyl aromatic monomer and hydrogenated butadiene of the composition of the invention is in the range between 40.000 $gmol^{-1}$ and 200.000 $gmol^{-1}$; preferably between 40.000 $gmol^{-1}$ and 100.000 $gmol^{-1}$.

In another preferred embodiment, the block copolymer of vinyl aromatic monomer and hydrogenated butadiene of the composition of the invention can be linear, radial or partially radial. Preferably, the block copolymer of vinyl aromatic monomer and hydrogenated butadiene of the composition of the invention is linear.

The term "linear" in the present invention refers to linear polymer structures which are obtained by sequential polymerization of vinyl aromatic monomers and conjugated dienes.

The term "radial" relates herein to radial polymers may be obtained by the coupling of a linear polymer with coupling agents, using procedures well known in the state of the art. These coupling procedures are carried out after the polymerization of linear chains; thus the coupling of several linear chains leads a new polymer molecule with radial architecture.

The term "partially radial" refers herein to a mixture of radial and linear polymers which are obtained after coupling reaction as a consequence of a yield lower than 100% of the coupling reaction, or when the coupling agent is added in defect with respect to the reactive polymer chains.

The aromatic vinyl compound which constitutes the vinyl aromatic monomer and hydrogenated butadiene can include, for example, styrene, [alpha]-methylstyrene, [beta]-methylstyrene, o-methylstyrene, m-methylstyrene, p-methylstyrene, 2,4-dimethylstyrene, 2,4,6-trimethylstyrene, 4-propylstyrene, t-butylstyrene, 4-cyclohexylstyrene, 4-dodecylstyrene, 2-ethyl-4-benzylstyrene, 4-(phenylbutyl)styrene, 1-vinylnaphthalene, vinylanthracene, indene, acetonaphthylene, monofluorostyrene, difluorostyrene, monochlorostyrene and methoxystyrene. The aromatic vinyl compound polymer block may have a structural unit comprising only one aromatic vinyl compound, or may have a structural unit comprising two or more of the aromatic vinyl compounds. Among them, it is preferred that the aromatic vinyl compound polymer block mainly comprises structural units derived from styrene.

It is also preferred that the styrene content in the block copolymer of vinyl aromatic monomer and hydrogenated butadiene of the composition of the invention that is in a weight percent between 25% and 50% based on the total weight of the block copolymer of vinyl aromatic monomer and hydrogenated butadiene; preferably in the weight percent between 25% and 40%.

In the present invention "the styrene content" of the block copolymer of vinyl aromatic monomer and hydrogenated butadiene refers to the structural units of styrene of the aromatic vinyl compound which constitute the block copolymer of vinyl aromatic monomer and hydrogenated butadiene.

The styrene units constituting a copolymer of vinyl aromatic monomer and hydrogenated butadiene can be distributed in blocks or randomly. In the present invention, the styrene units are distributed in blocks in the block copolymer of vinyl aromatic monomer and hydrogenated butadiene. The "styrene block content" refers to the weight percentage of styrene structural units that are reacted with other styrene units, relative to the total styrene content of the block copolymer of vinyl aromatic monomer and hydrogenated butadiene. The styrene block content of the copolymer of vinyl aromatic monomer and hydrogenated butadiene of the composition of the invention is higher than 70%, preferably higher than 85%, more preferably between 85% and about 100%.

The styrene content and the styrene block content are measured using proton NMR techniques.

In another preferred embodiment, the hydrogenation degree in the block copolymer of vinyl aromatic monomer and hydrogenated butadiene of the composition of the invention is higher than 70%, preferably higher than 85%, more preferably between 85% and about 100%.

In the present invention the term "hydrogenation degree" is defined as the percentage of hydrogenated butadiene with respect to the total fraction of butadiene in the block copolymer of vinyl aromatic monomer and hydrogenated butadiene, and is measured by proton nuclear magnetic resonance ($^1$H-NMR) technique.

In another preferred embodiment, the block copolymer of vinyl aromatic monomer and hydrogenated butadiene of the composition of the invention is poly(styrene-ethylene/butylene-styrene) (SEBS).

The second aspect of the present invention relates to a process of obtainment of the segmented block copolymer composition of the invention (herein "procedure of the invention"). It is a modification of the TPU synthesis based on the reactive extrusion of following ingredients:

- a functionalized block copolymer of vinyl aromatic monomer and hydrogenated butadiene comprising a terminal functional group selected from an hydroxyl group, a primary amino group or a secondary amino group,
- a polyol selected from a polyether polyol or a polyester polyol, preferably a polyesterdiol,
- a chain extender selected from ethylene glycol, diethylene glycol, 1,4-butane diol, 1,5-pentane diol, 2-methyl-1,3-propane diol, 1,6-hexane diol, preferably 1,4-butane diol,
- organic diisocyanate selected from 4,4'-diphenylmethane diisocyanate, toluene diisocyanate, p-phenylene diisocyanate, xylylene diisocyanate and naphthalene diisocyanate, a urethane forming catalyst selected from an organic tin compound or an amine compound, preferably dibutyldiacetyl tin and antioxidants selected from phenolic stabilizer, phosphite stabilizer or a combination thereof.

wherein the molar ratio between the NCO groups of the organic diisocyanate and the functional groups of the combination of the polyol, the chain extender, and the functionalized block copolymer of vinyl aromatic monomer and hydrogenated butadiene is between 0.8:1.2 and 1.2:0.8, preferably 1:1.

In a preferred embodiment the procedure of the invention comprises the following steps:
a) pre-heating of the polyol, the chain extender and the urethane forming catalyst,
b) pre-heating of the organic diisocyanate ingredient,
c) adding of the preheated ingredients of step (a) and (b) into an extruder at the same time, preferably into a twin screw extruder, and
c) adding the functionalized block copolymer and the antioxidant into the extruder.

The process to obtain the segmented block copolymer composition of the invention comprises a pre-heating step of the raw materials; a preheating of the polyol and chain extender together with the urethane forming catalyst. On a separate container, the organic diisocyanate is preheated. Both reactant streams are added into an extruder at the same time, preferably into a twin screw extruder, and the functionalized block copolymer of vinyl aromatic monomer and hydrogenated butadiene and the antioxidant is added during the extrusion process.

The functionalized block copolymer can be obtained by methods known for those skilled in the art. Since the yield of the functionalization reaction of the block copolymer can be lower than 100%, another ingredient in the process of the present invention may be non-functionalized block copolymers of vinyl aromatic monomer and hydrogenated butadiene, together with the functionalized block copolymer of vinyl aromatic monomer and hydrogenated butadiene. These non-functionalized block copolymers are not reactive and they may be part of the composition of the invention.

In a preferred embodiment, the functionalized block copolymer used as ingredient in the procedure of the invention has an average molecular weight Mp of between 40.000 and 200.000. More preferably, between 40.000 and 100.000.

A further embodiment of the present invention refers to the number of chains comprising functional groups in the functionalized linear block copolymer used as ingredient in the procedure of the invention which is higher than 50% with respect the total number of chains, preferably higher than 70%, more preferably between 70% and about 100%.

The term "about 100%" refers to a value closest to 100% considering the current technology and the knowledge of a skilled person, for example between 99.5 and 99.9%.

Another preferred embodiment relates to the polyol used as ingredient in the procedure of the invention which is a polyesterdiol with an average molecular weight of between 1.000 and 6.000, more preferably between 1.000 and 3.000.

In a preferred embodiment, the procedure of the invention is performed following an increasing temperature profile at temperatures ranging from 220° C. to 260° C. in an extruder, preferably a twin screw extruder.

Preferably, the functionalized block copolymer of vinyl aromatic monomer and hydrogenated butadiene used as ingredient of the procedure of the invention is a functionalized linear block copolymer of poly(styrene-ethylene/butylene-styrene) (SEBS).

A third aspect of the present invention provides a thermoplastic polymer composition (herein the thermoplastic composition of the invention) comprising
a segmented block copolymer composition according to the composition of the invention above mentioned,
a block copolymer of vinyl aromatic monomer and hydrogenated butadiene,
a polar polymer selected from thermoplastic polyurethane (TPU), polycarbonate, polyether, polyester, polyamide, acrylonitrile butadiene styrene (ABS), polybutylene terephthalate (PBT), polyethylene terephthalate (PET), polyoxymethylene (POM) and a mixture thereof,
and paraffinic oil.

In a preferred embodiment, the polar polymer of the thermoplastic polymer composition of the invention is thermoplastic polyurethane (TPU).

In a preferred embodiment, the thermoplastic polymer composition mentioned above is characterized in that
the segmented block copolymer composition ranges a percentage between 5% and 20% by weight; preferably between 5% and 15%; the block copolymer of vinyl aromatic monomer and hydrogenated butadiene ranges a percentage between 15% and 30% by weight; preferably 15% and 25%;
the polar polymer is thermoplastic polyurethane which is ranging a percentage between 30% and 60% by weight; preferably 40% and 50%;
and the paraffinic oil ranges a percentage between 10% and 30% by weight; preferably 15% and 25%.

Preferably, the block copolymer of vinyl aromatic monomer and hydrogenated butadiene in the thermoplastic composition of the invention is a block copolymer of poly(styrene-ethylene/butylene-styrene) (SEBS).

Another aspect of the present invention relates to the process of obtainment of the thermoplastic polymer composition which is performed by extrusion. It relates to a process of obtainment of the thermoplastic polymer composition of the invention which comprises the following steps:
a) drying of the polar polymer; preferably the polar polymer is thermoplastic polyurethane,
b) mixing of the block copolymer of vinyl aromatic monomer and hydrogenated diene, preferably butadiene, and the paraffinic oil,
c) pre-heating of the polar polymer obtained in step (a), the mixture obtained in step (b) and the segmented block copolymer composition
d) adding the pre-heated mixture obtained in step (c) into an extruder, preferably into a twin-screw extruder.

Another aspect of the present invention provides a laminate structure (herein the laminate structure of the invention) comprising at least the following two layers:
a) a substrate of a polar material selected from a polar polymer, a glass or a metal, and
b) a layer of the thermoplastic composition of the invention.

Preferably, the polar material of layer a) of the laminated structure of the invention is a polar polymer selected from thermoplastic polyurethane, polycarbonate, polyether, polyester, polyamide, acrylonitrile butadiene styrene (ABS), polybutylene terephtalate (PBT), polyethylene terephtalate (PET), polyoxymethylene (POM) and a mixture of thereof.

Another aspect of the present invention relates to the process of obtainment of the laminate structure of the invention, which is preferably performed by overmolding techniques. This procedure is well known for those skilled in the art, and it is described as a type of injection molding process in which a new polymer layer is allowed to be formed by injection molding over or around a previously molded part.

Another aspect of the present invention relates to polyurethane foam comprising the composition of the invention.

The segmented block copolymer composition of the invention provides chemical and physical resistance to the resulting foam, whereas the thermoplastic polyurethane block enhances the compatibility between the polyurethane foam and the block copolymer. The preferred method of manufacturing this polyurethane foam composition consists in dispersing the segmented block copolymer composition in the liquid long chain polyol conventionally used in the foam formulation, and effecting the foaming procedure. In some cases, the foaming is effected in the presence of a dispersing agent to the mixture of the polyol and segmented copolymer composition of the invention.

Any of the above described compositions containing the segmented block copolymer may optionally contain other polymers, and/or other additional components such as inorganic fillers, pigments, light stabilizers, flame retardants, antioxidants, oils, UV absorbers, and so on.

Unless otherwise defined, all technical and scientific terms used herein have the same meaning as commonly understood by one of ordinary skilled in the art to which this invention belongs. Methods and materials similar or equivalent to those described herein can be used in the practice of the present invention. Throughout the description and claims the word "comprise" and its variations are not intended to exclude other technical features, additives, components, or steps. Additional objects, advantages and features of the invention will become apparent to those skilled in the art upon examination of the description or may be learned by practice of the invention. The following examples and drawings are provided by way of illustration and are not intended to be limiting of the present invention.

EXAMPLES

Example 1. Synthesis of Amino-Functionalized SEBS

Figure 1:
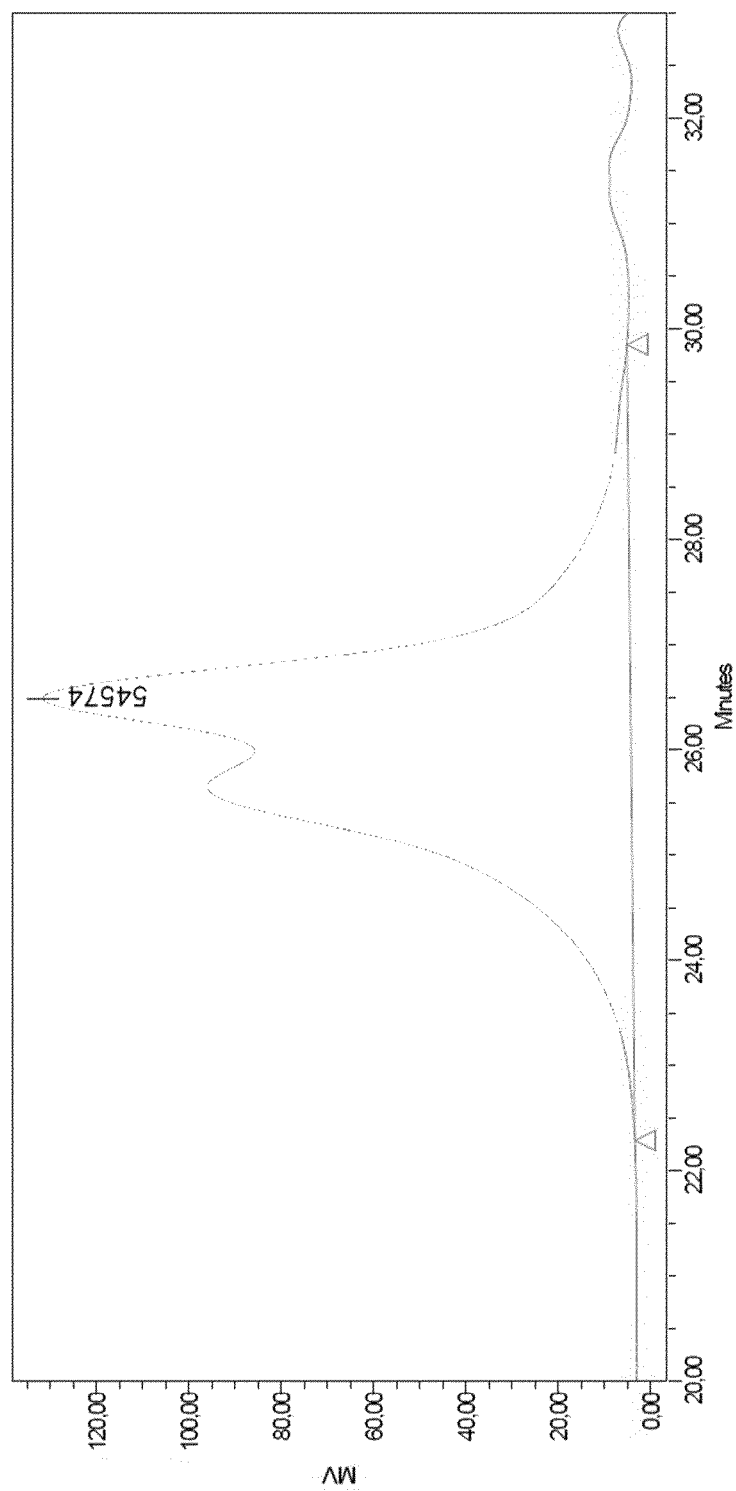
FIG. 1. GPC analysis of the segmented block copolymer composition SEBS-N-TPU obtained in Example 3, following a TPU synthesis procedure.

The polymers to be hydrogenated and functionalized were prepared by anionic polymerization in cyclohexane, using n-butyl lithium as the initiator and tetrahydrofuran or diethoxypropane as polar modifiers. The monomers used were styrene and 1,3-butadiene. A sample of the polymer obtained was isolated from the solution and was analyzed: The microstructure was determined by 1H-NMR, and the molecular weight and polydispersity index were measured by gel permeation chromatography (GPC).

Hydrogenation of the polymers was performed in an autoclave reactor with a inner capacity of 2 Liters, with a control system for the temperature, stirring and hydrogen flowmeter, as well as nitrogen and hydrogen inlets, venting and polymer solution output. The polymer's hydrogenation percentage was analysed by 1H-NMR.

The amino-functionalized hydrogenated styrene-butadiene-styrene (SEBS-NH) was prepared by anionic polymerization in cyclohexane solution, using a monomer concentration of 10% weight in a 2 L capacity reactor. The procedure involved the sequential addition of the monomers, using tetrahydrofuran (THF) as the polar modifier, the addition of 2.71 mmol of N-butylidenebenzylamine as the amino-functionalization agent, and finishing the living polymer with 2.71 mmol of 2,6-di-tert-butyl-4-methylphenol (BHT).

The composition and molecular weight of the polymer were the following: styrene (30% weight) and butadiene (70% weight) (vinyl content in polybutadiene: 35% weight), with Mw=50,000 g/mol and polydispersity index=1.1.

The polymer solution was subsequently heated to 90° C. and 0.5 mmol of the titanium bis(-butylcyclopentadienyl)-bis(4-methoxyphenyl) catalyst per 100 g of polymer were added.

The autoclave was pressurized with hydrogen to 10 bar, and a significant consumption thereof was observed, whilst the temperature of the solution rose to 125° C. After 50 minutes, the reaction medium ceased to consume hydrogen and the hydrogenation reaction was considered to be concluded. The reactor was cooled down and de-pressurized, and the resulting polymer was separated from the solvent by precipitation in a water-steam mixture, and oven dried. The polymer microstructure indicated that 99.7% of the original butadiene unsaturations were hydrogenated, whereas the styrene unsaturations remained intact. The molecular weight was also determined, and it indicated that there was no polymer degradation or crosslinking.

Example 2. Synthesis of Hydroxyl-Functionalized SEBS

The hydroxyl-functionalized hydrogenated styrene-butadiene-styrene (SEBS-OH) was prepared following the procedure described in Example 1, but using 3.80 mol of propylene oxide as the hydroxyl-functionalization agent, and finishing the living polymer with 0.54 mmol of 2,6-di-tert-butyl-4-methylphenol (BHT).

Example 3. Synthesis of a Segmented Block Copolymer Composition from an Amino-Functionalized SEBS (TPU-N-SEBS) by TPU Synthesis Process A segmented block copolymer (TPU-N-SEBS) was produced using an amino-functionalized SEBS and following the procedure:

1009 grams of a polyester polyol of 3-methyl-1,5-pentanediol and adipic acid with molecular weight 2000 and 157.7 grams of 1,4-butanediol were heated to 80° C. to reduce the viscosity of the polyol and to melt the chain-extender. Then, in order to avoid the degradation of the amino-functionalized SEBS during the TPU polymerization, antioxidants Irganox 1330 and Irgafos 168 were dispersed in the mixture in an amount low enough not to affect the synthesis process. After that, the mixture was vacuum dried.

Finally, 1 ppm of dibutyltin diacetate was added. At the same time, 563.1 grams of 4-4'-methylenbis(phenylisocyanate) (MDI) were preheated to 65° C. until melting, and also vacuum dried.

All the monomers were fed into the feed zone of a co-rotating intermeshing twin-screw extruder (L/D=44) with addition rates of 2.78 kg/h for the polyol/butanediol mixture and 1.35 kg/h for MDI. The temperature setting profile was increased from 220° C. to 260° C. in order to favor a slow polymerization reaction of TPU, so that the resulting copolymer does not contain long TPU polymer segments.

The amino-functionalized SEBS previously prepared in Example 1 was continuously fed into the twin-screw extruder before the compression zone, with a feed rate of 5 kg/h to effect the reaction with the resulting product of the above-described TPU formation. The reaction product was continuously cut under water in pellets with a pelletizing machine. The resulting copolymer pellets were dried and analyzed.

The copolymer's microstructure was determined by proton and carbon NMR, whereas the molecular weight and polydispersity index were measured by gel permeation chromatography (GPC). The GPC chromatogram of the segmented block copolymer obtained TPU-N-SEBS is shown in FIG. 1. The weight content of diblock and triblock copolymers obtained was 70%, with a diblock/triblock ratio of 1.

Example 4. Synthesis of a Segmented Block Copolymer Composition from a Hydroxyl Functionalized SEBS by TPU Synthesis Process A segmented block copolymer (TPU-O-SEBS) was produced following the procedure described in Example 3. In this case, hydroxyl-functionalized SEBS previously prepared in Example 2 was continuously fed before the compression zone into the twin-screw extruder at a feed rate of 5 kg/h. The reaction product was continuously cut under water in pellets with a pelletizing machine. The resulting copolymer pellets were dried and analyzed.

Figure 2:
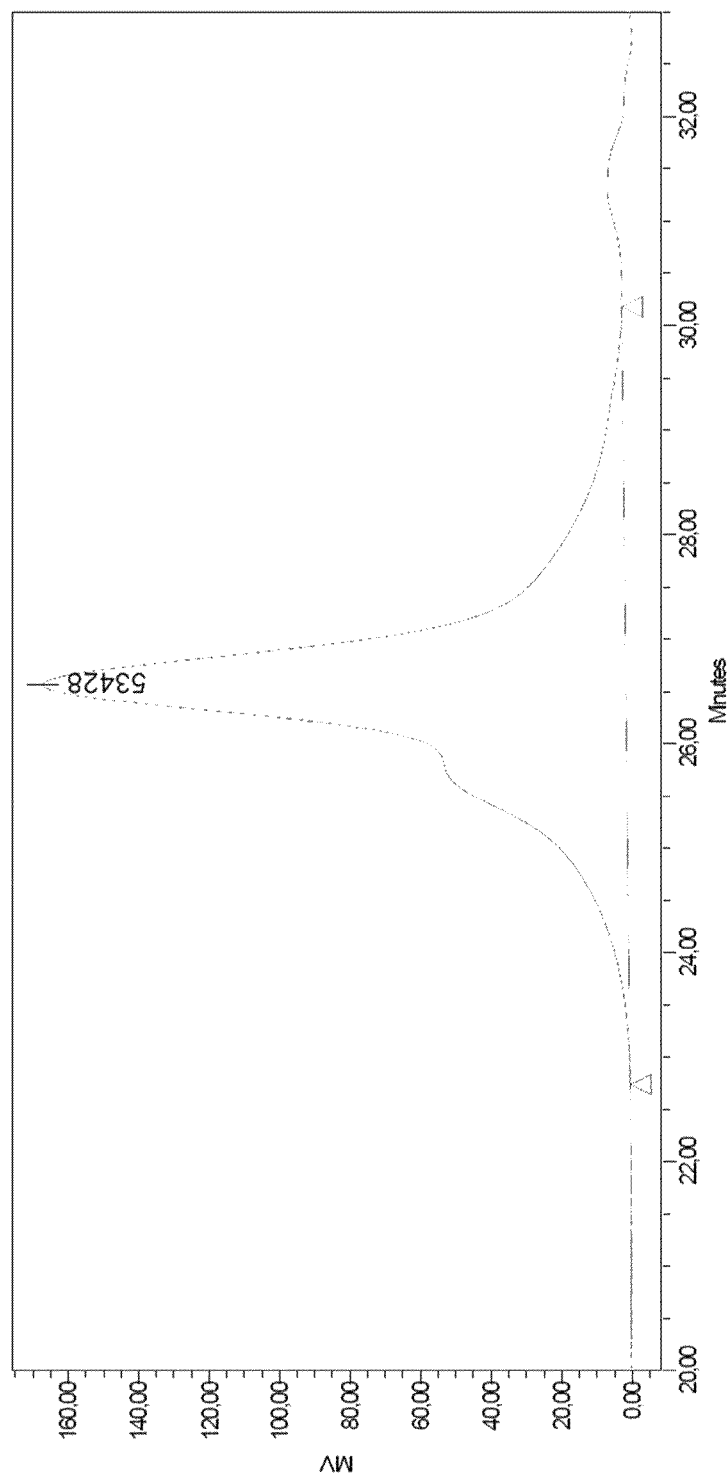
FIG. 2. GPC analysis of the segmented block copolymer composition SEBS-O-TPU obtained in Example 4, following a TPU synthesis procedure.

The copolymer's microstructure was determined by proton and carbon NMR, whereas the molecular weight and the polydispersity index were measured by gel permeation chromatography (GPC). The GPC chromatogram of the segmented block copolymer obtained TPU-O-SEBS is shown in FIG. 2. The yield of the synthesis process was 43%, with a diblock/triblock copolymer ratio of 1.3.

Example 5. Synthesis of TPU-X-SEBS Segmented Block Copolymer Composition by TPU and SEBS-f Blending (being X=N or O)

The products claimed in this invention cannot easily be obtained by other procedures different than the synthesis procedures described in the previous Examples 3 and 4.

The synthesis of a TPU-O-SEBS segmented block copolymer was attempted by melt-mixing of the components in a Haake Internal Mixer at 230° C. during 15 minutes. The raw materials consisted in a commercial polyester-type TPU (AVALON® 85 AB from Huntsman) and a hydroxyl-functionalized hydrogenated styrene-butadiene-styrene (SEBS-OH) with a molecular weight of 50,000. The components were mixed in a weight ratio 60:40, with 0.25 ml of the transesterification catalyst dioctyltin dilaurate (TIB-KAT®-216 from TIB Chemicals).

Figure 3:
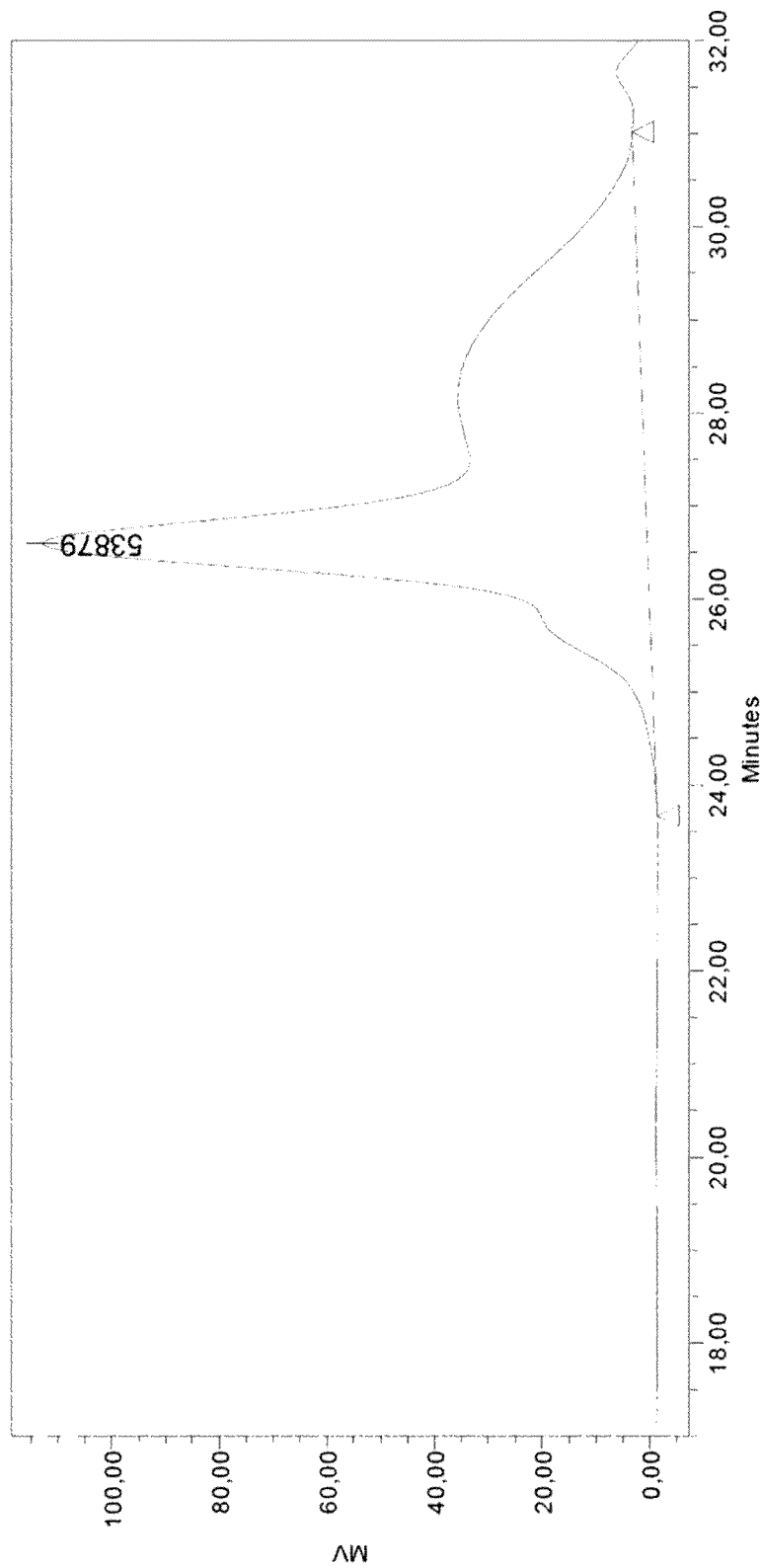
FIG. 3. GPC analysis of the product obtained in Example 5, following a blending procedure.

The microstructure of the copolymer was determined by proton and carbon NMR, and the molecular weight and the polydispersity index were measured by gel permeation chromatography (GPC). The yield of the synthesis process of the TPU-O-SEBS segmented block copolymer mixture obtained in Example 5 was less than 30%. The GPC represented in FIG. 3 shows the low amount of high molecular weight copolymer obtained, as compared with the GPCs from the samples obtained with the TPU synthesis procedure of Examples 3 and 4, and shown in FIGS. 1 and 2, respectively.

The blending procedure was not reproducible, yielding unhomogeneous samples with degraded areas: some parts of the same sample were foamed, some were melted, and some were burnt).

Example 6. Comparison Between the Mechanical Properties of the TPU-X-SEBS Segmented Block Copolymers (being X=N or O), TPU/SEBS Blend and Pure TPU The products obtained previously in Examples 3 (TPU-N-SEBS segmented block copolymer composition) and 4 (TPU-O-SEBS segmented block copolymer composition), were mold-injected into test specimens using a SANDRETTO Nove 430 HP 100 injection molding machine, at a pressure of 45 bar and temperature of 190-220° C.

On the other hand, a TPU/SEBS blend having the same weight ratio of SEBS and TPU as the segmented block copolymer compositions was obtained using a Haake internal mixer at 200° C. during 10 minutes.

At last, a commercial TPU sample (Avalon 85AB from Huntsman) was used as a comparative sample.

These materials were tested using the following methods;

Hardness Shore A (ASTM D2240). This test method permits hardness measurements based on indentation into the material under specified conditions, using a measurement device called durometer.

Compression Set (ASTM D395B). This test is intended to measure the ability of rubber compounds to retain elastic properties after prolonged action of compressive stresses. A test specimen is compressed to a deflection and maintained under this condition for a specified time and at a specified temperature. The residual deformation is measured 30 minutes after removal from a suitable compression device.

Abrasion Resistance (ASTM D5963). This property is measured by moving a test piece across the surface of an abrasive sheet mounted to a revolving drum, and is expressed as volume loss in cubic millimeters, or abrasion resistance index in percent. For volume loss, a smaller number indicates better abrasion resistance.

Tear Strength (ASTM D624). A tearing strain (and stress) is applied to a test specimen by means of a tensile testing machine operated without interruption at a constant rate of crosshead traverse until the specimen is completely torn. This method measures the force per unit thickness required to rupture, initiate, or propagate a tear through a sheet of rubber of a specific geometry.

Tensile strength and Elongation at break (ISO 527). The testing involves taking a small sample with a fixed cross section area, and then pulling it with a tensometer, gradually increasing force until the sample breaks. The tensile strength is the maximum stress that the material can withstand under these conditions before failing or breaking. The elongation at break is the change in the length of the test specimen with respect to its initial length, just before failure. It expresses the capability of a material to resist changes of shape without crack formation.

Melt flow rate (ASTM D1238). This test method covers the determination of the rate of extrusion of molten thermoplastic resins using an extrusion plastometer: After a specified preheating time, the resin is extruded through a die with specified dimensions and under specific conditions. For thermoplastic materials, the units of the melt flow rate (MFR) are grams of material per every 10 minutes of extrusion (g/10 min).

Results obtained are shown in Table 1.

TABLE 1

Mechanical properties of TPU-X-SEBS segmented block copolymer compositions (column 2 X = O and column 3 X = N), pure TPU (column 4) and TPU/SEBS blend (column 1).

|  | (1) SEBS/TPU blend | (2) SEBS-O-TPU | (3) SEBS-N-TPU | (4) Commercial TPU Avalon 85AB |
|---|---|---|---|---|
| Hardness (3s), Shore A | 65 | 77 | 73 | 83 |
| Compression Set (24 h, 40° C.), % | 70 | 79 | 67 | 43 |
| Elongation @ Break, % | 448 | 558 | 548 | 640 |
| Tensile Strength @ break, MPa | 12 | 31 | 41 | 40 |
| 100% Modulus, MPa | 5 | 5 | 4 | 6 |
| 300% Modulus, MPa | 9 | 9 | 9 | 10 |
| 500% Modulus, MPa | 15 | 20 | 29 | — |
| Abrasion loss, mm3 | 667 | 566 | 256 | 122 |
| Tear Strength, KN/cm | 65 | 66 | 81 | 110 |

The values of the pure TPU shown in column (4) indicate that this material provides good mechanical resistance (high values of hardness, tensile strength, tear resistance and low abrasion loss).

The aim of blending hard TPU with soft SEBS elastomer is to decrease hardness value. In column (1) these results are shown, but the decrease in hardness is accompanied by a huge increase in the abrasion loss, and by a remarkable sinking of the tensile strength and the tear resistance values. Both events are undesirable for applications that require high mechanical properties.

These drawbacks are not found for the TPU-X-SEBS segmented block copolymer compositions (X=O or N, columns 2 and 3 respectively). They both show the expected decrease in hardness, but in both samples the tensile strength resembles more the one of pure TPU, indicating excellent tensile properties.

Moreover, the low value of abrasion loss and high tear resistance obtained for sample TPU-N-SEBS (column 3) indicate a material which is softer than TPU but maintaining its mechanical properties. Therefore, SEBS-N-TPU segmented block copolymer composition will be the best choice in applications that require mechanical strength.

Example 7. Preparation of TPU/SEBS Thermoplastic Polymer Compositions Comprising the Segmented TPU-X-SEBS Block Copolymer Compositions of the Invention (X=O, N), and Measurement of Mechanical Properties TPU-SEBS thermoplastic compositions were prepared using commercial samples of thermoplastic polyurethane (TPU) of the polyester type (AVALON® 85 AB from Huntsman), commercial samples of hydrogenated styrene/ethylene butylene/styrene block copolymer (SEBS) (Calprene H 6170 from Dynasol) and TPU-X-SEBS segmented block copolymer compositions obtained in Examples 3 and 4, respectively, and used as compatibilizers in this Example. The results were compared with the same composition, prepared using a reference sample (TU S5265® of Kuraray Company) of a polymer which is a reaction product of polyurethane and hydrogenated styrene diene polymer forming mainly diblocks.

The thermoplastic compositions were prepared according to the following procedure: During 1 hour, TPU was previously dried at 100° C. in an oven, and at the same time SEBS was premixed with paraffinic oil KRISTOL M70. Then, the mixture of TPU, SEBS, and TPU-X-SEBS segmented block copolymer mixture or reference sample was heated to a temperature sufficient to melt or to soften the ingredient of the thermoplastic composition which has the highest softening point. Afterwards, all the ingredients were fed into a twin-screw extruder BAKER PERKINS APV MP-2030 working at 40-45 bar with an increasing temperature setting profile from 150° C. to 220° C.

Table 2 depicts the four different thermoplastic polymeric compositions prepared this way.

TABLE 2

TPU/SEBS thermoplastic polymeric compositions

|  | COMP1 | COMP2 | COMP3 | COMP4 |
|---|---|---|---|---|
| SEBS, Calprene H-6170 | 100 | 100 | 100 | 100 |
| TPU-O-SEBS | 0 | 50 | 0 | 0 |
| TPU-N-SEBS | 0 | 0 | 50 | 0 |
| Reference sample | 0 | 0 | 0 | 50 |
| TPU, AVALON ® 85 AB | 200 | 200 | 200 | 200 |
| Paraffinic Oil, KRISTOL M70 | 100 | 100 | 100 | 100 |
| Antioxidant, IRGANOX 1010 | 0.1 | 0.1 | 0.1 | 0.1 |

The prepared thermoplastic polymeric compositions were mold-injected following the procedure described in Example 6 to evaluate their properties. The same measurement methods as in Example 6 were used, and the results obtained are presented in Table 3:

Hardness Shore A (ASTM D2240)
Compression Set (ASTM D395B)
Abrasion Resistance (ASTM D5963)
Tear Strength (ASTM D624)
Tensile strength and Elongation at break (ISO 527)
Melt flow rate (ASTM D1238)

TABLE 3

Mechanical properties of TPU/SEBS thermoplastic polymeric compositions prepared.

|  | COMP1 | COMP2 | COMP3 | COMP4 |
|---|---|---|---|---|
| Hardness, Shore A | 58 | 55 | 62 | 60 |
| Compression Set (24 h, 70° C.), % | 67 | 70 | 68 | 75 |
| Elongation @ Break, % | 479 | 535 | 550 | 471 |
| Tensile Strength, MPa | 3.3 | 4.8 | 6.9 | 3.9 |
| Abrasion loss, mm3 | 564 | 239 | 421 | 208 |
| Tear Strength (KN/cm) | 29 | 34 | 37 | 38 |

The results obtained show that the composition COMP1 which has no compatibilizer, presents the worst mechanical properties.

The three compositions containing compatibilizers present similar values of hardness, compression set, and tear strength. But remarkably, the polymeric compositions containing the TPU-X-SEBS block copolymer compositions of the invention (COMP2 and COMP3) present higher values of tensile strength and elongation at break than COMP1 and COMP4. Therefore, the addition of the segmented block copolymers of the invention to TPU/SEBS polymeric compositions leads to better tensile properties.

The use of a commercial sample of compatibilizer in composition COMP4 does not improve the mechanical properties. The better value observed in abrasion resistance with respect to the composition without compatibilizer COMP1 is matched by the composition COMP2 containing the TPU-O-SEBS block copolymer composition of the invention.

Example 8. Measurement of Adhesive Properties of the TPU/SEBS Thermoplastic Polymer Compositions Comprising the Segmented TPU-X-SEBS Block Copolymer Compositions of the Invention (X=O, N) in a Laminate Structure The TPU/SEBS polymeric compositions described in Example 7 and detailed in Table 2, were overmolded on a pure TPU sheet to form a laminate structure of the invention. The overmolding was effected using the injection procedure described in Example 6, and the peel adhesion was measured following the test method ASTM D903. This test method covers the determination of the comparative peel or stripping characteristics of adhesive bonds when tested on standard-sized specimens and under defined conditions. The peel or stripping strength is the average load per unit of bond line (kg/mm) required to separate progressively one member from the other. The results obtained are shown in Table 4.

TABLE 4

Adhesive properties to a TPU probe of TPU/SEBS thermoplastic polymeric compositions prepared in Example 7.

|  | COMP1 | COMP2 | COMP3 | COMP4 |
|---|---|---|---|---|
| Peel Strength, kgf | 4.6 | — | 13.4 | 5.0 |
| Peel resistance, kg/cm | 1.9 | — | 5.4 | 2.0 |
| Failure type | Adhesive | Substrate | Cohesive | Cohesive |

The results of Table 4 show a much better adhesive performance of the samples formed with COMP2 and COMP3 on a TPU probe. This is proved by the higher values of peel strength and peel resistance obtained in sample from COMP3.

Especially sample formed with COMP2 which contains the TPU-O-SEBS block copolymer composition presents a substrate failure: This means that the adhesive strength between the phases is so strong that the probe breaks during the test, and phases are not separated. Therefore, no peel strength and peel resistance values could be measured for this sample.

The peel strength and peel resistance values of the polymeric composition containing the reference compatibilizer (sample obtained from COMP4) are the same as the sample obtained with composition COMP1 without compatibilizer; thus the reference sample does not present any advantage regarding these properties.

Example 9. Dispersion of TPU-X-SEBS Segmented Block Copolymer Compositions on Polyol Components for PU Foam Preparation The segmented block copolymers obtained in Examples 3 (TPU-N-SEBS) and 4 (TPU-O-SEBS) were milled to a particle size of 0.75 mm, and dispersed independently on two commercial polyols. The polyols used were ALCUPOL F-2831 (viscosity at 25° C. 1.100 cP, hydroxyl number 28) and ALCUPOL F-5511 (viscosity at 25° C. 490 cP, hydroxyl number 55) from Repsol Quimica. The concentration of segmented block copolymer in each one of the commercial polyols was 10% w/w.

For the dispersion of the segmented block copolymers in the polyols, a Static Mixer Silverson L4R was used at 2500-3500 rpm during 1 minute. After this step, the stability of the dispersion was observed during the following 12 days, measuring the phase separation between the segmented block copolymer and the polyol (FIGS. 4 and 5).

Figure 4:
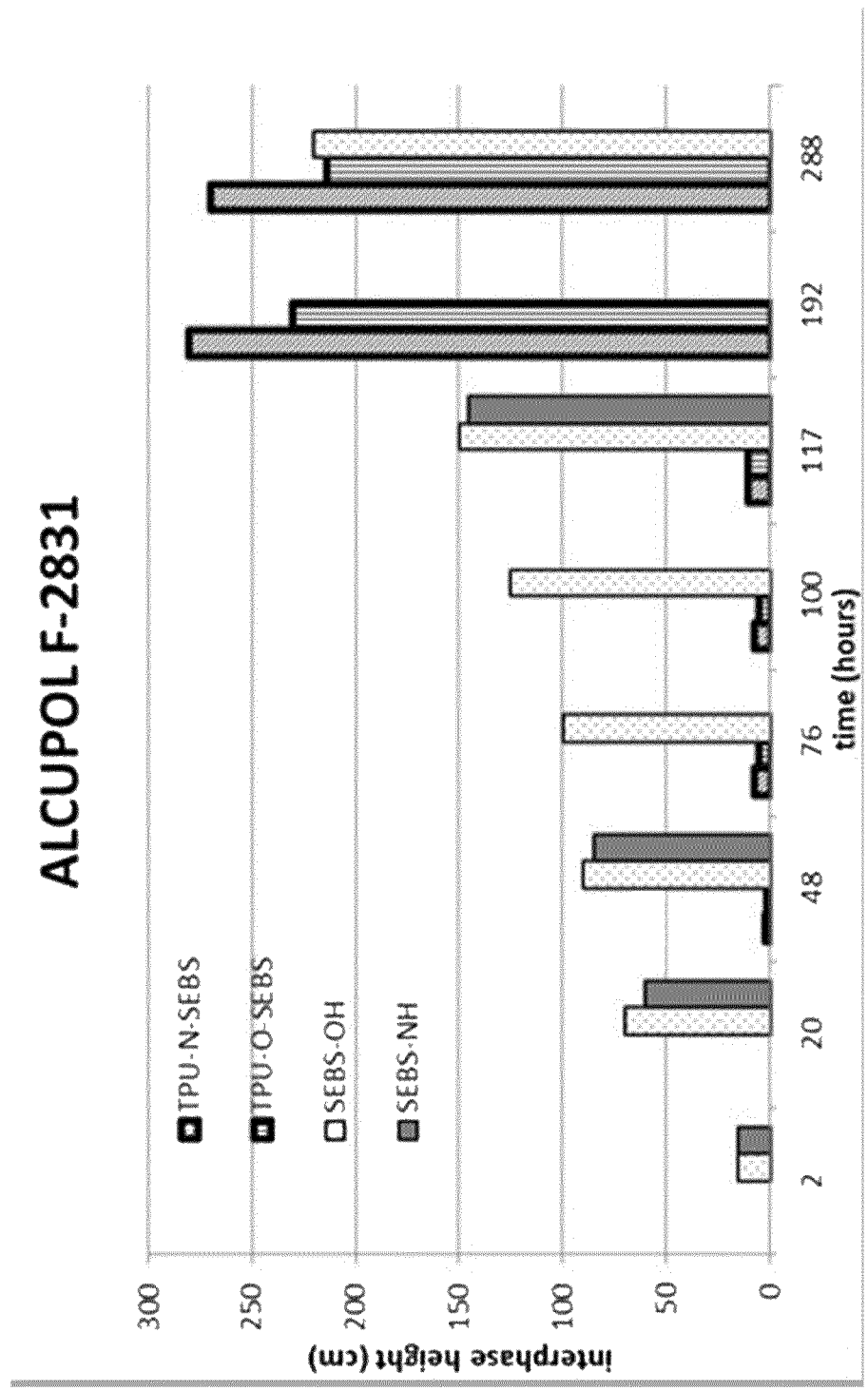
FIG. 4. Interface height of segmented block copolymer compositions of the invention, and functionalized SEBS materials dispersed in ALCUPOL F-2831 polyol.

The results indicate that the dispersions of TPU-N-SEBS and TPU-O-SEBS on ALCUPOL F-2831 are stable for at least 100 hours (FIG. 4). In contrast, the dispersions of the functionalized SEBS obtained in Examples 1 and 2 are unstable, and the two samples of functionalized SEBS precipitate immediately. The same occurs when dispersing commercial SEBS Calprene H 6110 (from Dynasol): the dispersion obtained is unstable, and the SEBS precipitates immediately.

Figure 5:
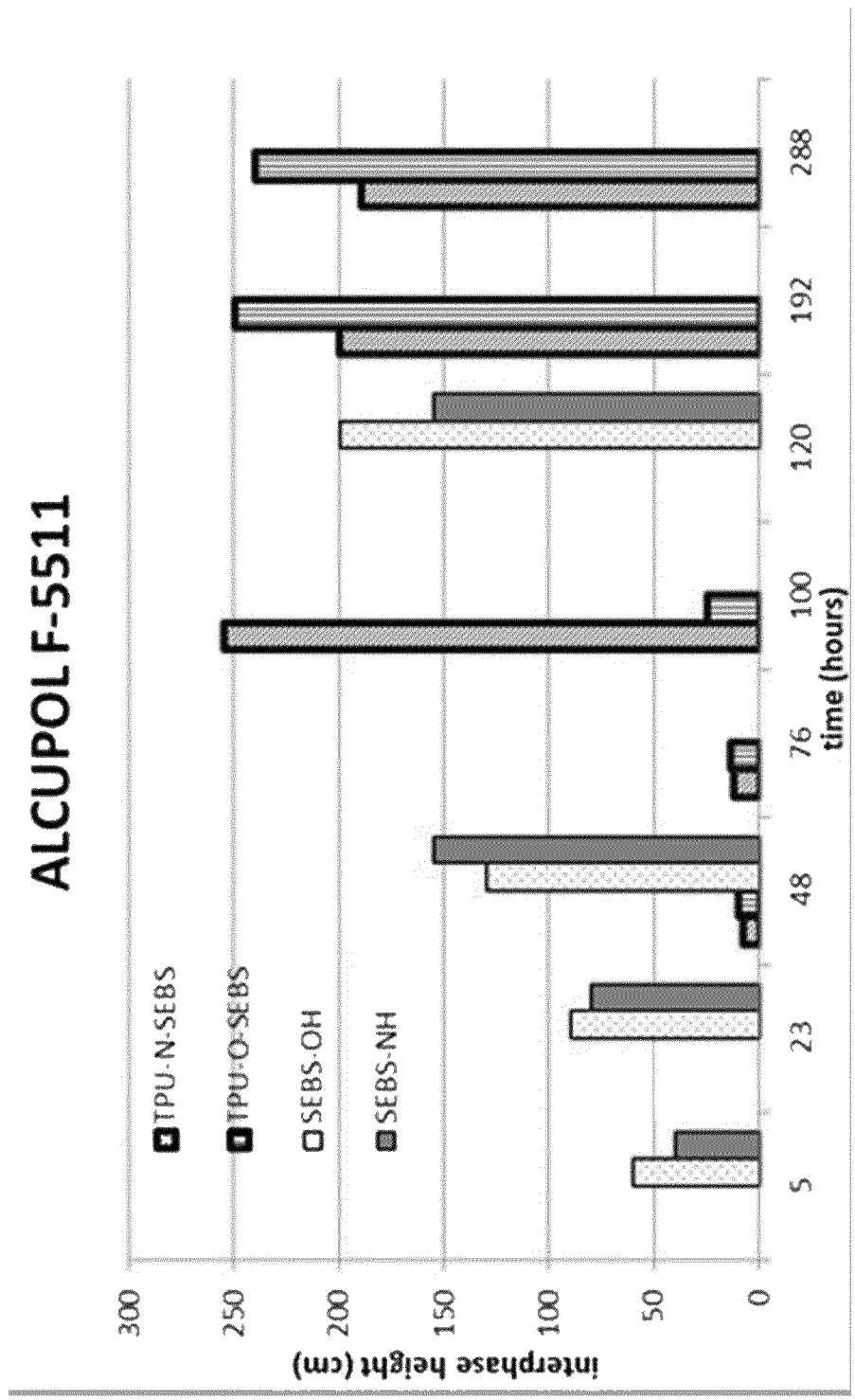
FIG. 5. Interface height of segmented block copolymer compositions of the invention, and functionalized SEBS materials dispersed in ALCUPOL F-5511 polyol.

The dispersion of the segmented block copolymer TPU-O-SEBS on ALCUPOL F-5511 is stable for at least 100 hours (FIG. 5). The dispersion of the segmented block copolymer TPU-N-SEBS is not as stable, and the segmented block copolymers precipitates before 70 hours. Finally, when the dispersion of the functionalized SEBS obtained in Examples 1 and 2 on ALCUPOL F-5511 are unstable, and the functionalized SEBS precipitates immediately. The same occurs when dispersing commercial SEBS Calprene H 6110: the dispersion obtained is unstable and the SEBS precipitates immediately.

Example 10. Synthesis of Polyurethane Foam Using TPU-X-SEBS Segmented Block Copolymer Compositions Different amounts of commercial SEBS Calprene H6110 (from Repsol) and segmented block copolymer obtained in Example 3 (TPU-N-SEBS) were dispersed in a polyol mixture by means of stirring the samples at 2.000 rpm at room temperature. The polyol mixture was composed of ALCUPOL F2831 (hydroxyl number 28) and ALCUPOL F3231 (hydroxyl number 28) grades from Repsol Quimica.

These compositions were used in a conventional high resilience foam formulation procedure. Besides the polyols and solids described above, the following components were used: toluene diisocyanate T80 from BASF (mixture of isomers), amine catalysts from Evonik (triethylene diamine TEGOAMIN_33, and bis(2-dimethylaminoethyl)ether TEGOAMIN-BDE), silicone surfactant (L_595 from Momentive) and water. The foam formulations prepared are detailed in Table 5.

TABLE 5

Components used in the high resilience foam formulations

| Component (g) | FORM 1 | FORM 2 | FORM 3 |
|---|---|---|---|
| F2831 | 25 | 25 | 25 |
| F3231 | 75 | 75 | 75 |

TABLE 5-continued

Components used in the high resilience foam formulations

| Component (g) | FORM 1 | FORM 2 | FORM 3 |
|---|---|---|---|
| Water | 1.6 | 1.0 | 1.0 |
| CH6110 | 0 | 5 | 0 |
| SEGM-NH | 0 | 0 | 5 |
| TDI (T80) | 17.2 | 17.2 | 17.2 |
| TEGOAMIN_33 | 0.42 | 0.42 | 0.42 |
| TEGOAMIN-BDE | 0.1 | 0.1 | 0.1 |
| L_595 | 1 | 1 | 1 |

The foaming procedure started with the preparation of two separate phases: On one hand, the mixture of polyols (optionally containing the solid polymers), catalysts and surfactants, was tempered to 20° C. following the procedure described in Example 8. On the other hand, the isocyanate was also kept at 20° C. Both phases were added at the same time to a plastic recipient where they were mixed at 4.000-5.000 rpm with a Heidolph stirrer. Immediately after, the reaction mixture was transferred into a mold, where the foam was allowed to rise. Once the foam was formed, it was introduced in an oven at 100° C. during 5 minutes to eliminate volatiles.

The following properties of the different foam samples were measured, according to the methods in brackets:

Density (UNE EN ISO 845). The method used determines the apparent density and the nucleus apparent density of plastics and cellular rubbers. It consists in measuring the exact volume and weight of a specimen of cellular material in a controlled atmosphere.

Compression Load Deflection (UNE EN ISO 3386/1) is a measure of the firmness of the foam, and its value is expressed in pound per square inch (psi) at a given percentage deflection. To obtain the value, a sample plate is manufactured and compressed in a indenter platen.

Tensile strength and elongation (UNE EN ISO 1798). The definition of these properties is already given in Example 6. In this case, the method used applies to flexible cellular materials.

The results are shown in Table 6.

TABLE 6

Mechanical properties of high resilience foams

|  | FORM 1 | FORM 2 | FORM 3 |
|---|---|---|---|
| Density (g/m3) | 60.5 | 61.9 | 60.8 |
| CLD@25% (kPa) | 2.8 | 2.54 | 2.4 |
| CLD@40% (kPa) | 3.35 | 3.06 | 2.92 |
| CLD@60% (kPa) | 6.67 | 6.27 | 6.04 |
| Tensile strength (kPa) | 53.1 | 49.6 | 56.8 |
| Elongation (%) | 203 | 207 | 234 |

The results show that all the samples present similar density and CLD values. Sample obtained from FORM1 in absence of any loaded particles, presents the comparative values of tensile properties (tensile strength and elongation). Sample from FORM2 containing 5% of a conventional SEBS rubber presents a decrease in Tensile strength, and similar Elongation value as comparative FORM1. The better tensile performance is observed for sample FORM3 containing the TPU-N-SEBS block copolymer composition of the invention.

The invention claimed is:

1. A segmented block copolymer composition comprising
    a diblock copolymer comprising a block copolymer consisting of vinyl aromatic monomer and hydrogenated butadiene and a block of thermoplastic polyurethane,
    and/or a triblock copolymer comprising two terminal blocks consisting of vinyl aromatic monomer and hydrogenated butadiene and a mid-block of thermoplastic polyurethane,
wherein
    copolymer and thermoplastic polyurethane blocks are linearly bonded by O or N atoms.

2. A segmented block copolymer composition according to claim 1 comprising
    a diblock copolymer comprising a block copolymer consisting of vinyl aromatic monomer and hydrogenated butadiene and a block of thermoplastic polyurethane,
    and a triblock copolymer comprising two terminal blocks consisting of vinyl aromatic monomer and hydrogenated butadiene and a mid-block of thermoplastic polyurethane,
wherein
    copolymer and thermoplastic polyurethane blocks are linearly bonded by O or N atoms.

3. The composition according to claim 1, wherein:
    the molecular weight of the peak $M_p$ of the diblock copolymers is in the range between 60.000 gmol$^{-1}$ and 125.000 gmol$^{-1}$; and
    the molecular weight of the peak $M_p$ of the triblock copolymers is in the range between 110.000 gmol$^{-1}$ and 320.000 gmol$^{-1}$.

4. The composition according to claim 1, which further comprises:
    block copolymer consisting of vinyl aromatic monomer and hydrogenated butadiene and/or functionalized block copolymer consisting of vinyl aromatic monomer and hydrogenated butadiene
    and/or thermoplastic polyurethane.

5. The composition according to claim 1, wherein
    the aromatic vinyl compound polymer block comprises structural units derived from styrene and
    the styrene content in the block copolymer consisting of vinyl aromatic monomer and hydrogenated butadiene is in a weight percent between 25% and 50% based on the total weight of the block copolymer consisting of vinyl aromatic monomer and hydrogenated butadiene.

6. The composition according to claim 1, wherein the hydrogenation degree in the block copolymer consisting of vinyl aromatic monomer and hydrogenated butadiene is higher than 70.

7. The composition according to claim 1, wherein the block copolymer consisting of vinyl aromatic monomer and hydrogenated butadiene is poly(styrene-ethylene/butylene-styrene).

8. A process of obtainment of the segmented block copolymer composition according to claim 1 is based on the reactive extrusion of following ingredients:
    a functionalized block copolymer consisting of vinyl aromatic monomer and hydrogenated butadiene comprising a terminal functional group selected from a hydroxyl group, a primary amino group or a secondary amino group,
    a polyol selected from a polyether polyol or a polyester polyol,
    a chain extender selected from ethylene glycol, diethylene glycol, 1,4-butane diol, 1,5-pentane diol, 2-methyl-1, 3-propane diol, 1,6-hexane diol, organic diisocyanate selected from 4,4'-diphenylmethane diisocyanate, toluene diisocyanate, p-phenylene diisocyanate, xylylene diisocyanate and naphthalene diisocyanate, a urethane forming catalyst selected from an organic tin compound or an amine compound, and an antioxidant selected from a phenolic stabilizer, a phosphite stabilizer or a combination thereof;

wherein the molar ratio between the NCO groups of the organic diisocyanate and the functional groups of the combination of the polyol, the chain extender and the functionalized block copolymers consisting of vinyl aromatic monomer and hydrogenated butadiene is between 0.8:1.2 and 1.2:0.8.

9. The process according to claim 8, which comprises the following steps:
   a) pre-heating of the polyol, the chain extender and the urethane forming catalyst
   b) pre-heating of the organic diisocyanate ingredient,
   c) adding of the preheated ingredients of step (a) and step (b) into an extruder at the same time, and
   d) adding the functionalized linear block copolymer and the antioxidant into the extruder.

10. A thermoplastic polymer composition comprising
   a segmented block copolymer composition according to claim 1,
   a block copolymer consisting of vinyl aromatic monomer and hydrogenated diene,
   a polar polymer selected from thermoplastic polyurethane, polycarbonate, polyether, polyester, polyamide, acrylonitrile butadiene styrene, polybutylene terephthalate, polyethylene terephthalate, polyoxymethylene and a mixture thereof
   and paraffinic oil.

11. The thermoplastic polymer composition according to claim 10, wherein
   the segmented block copolymer composition ranges a percentage between 5% and 20% by weight;
   the block copolymer consisting of vinyl aromatic monomer and hydrogenated diene ranging a percentage between 15% and 30% by weight; preferably between 15% and 25%;
   the polar polymer is thermoplastic polyurethane which is ranging a percentage between 30% and 60% by weight;
   and the paraffinic oil ranges a percentage between 10% and 30% by weight.

12. The thermoplastic polymer composition according to claim 10, wherein the block copolymer consisting of vinyl aromatic monomer and hydrogenated butadiene is a block copolymer of hydrogenated poly(styrene-ethylene/butylene-styrene).

13. A process of obtainment of the thermoplastic polymer composition according to claim 10 which comprises the following steps:
   a) drying of the polar polymer,
   b) mixing of the block copolymer consisting of vinyl aromatic monomer and hydrogenated diene, and the paraffinic oil,
   c) pre-heating of the polar polymer obtained in step (a), the mixture obtained in step (b) and the segmented block copolymer composition
   d) adding the pre-heated mixture obtained in step (c) into an extruder.

14. A laminate structure comprising at least the following two layers:
   a) a substrate of a polar material selected from a polar polymer, a glass or a metal, and
   b) a layer of the thermoplastic polymer composition according to claim 10.

15. The laminate structure according to claim 14, wherein the polar material of layer a) is a polar polymer selected from thermoplastic polyurethane, polycarbonate, polyether, polyester, polyamide, acrylonitrile butadiene styrene, polybutylene terephthalate, polyethylene terephthalate, polyoxymethylene and a mixture of thereof.

16. A polyurethane foam comprising the segmented block copolymer composition according to claim 1.

* * * * *